July 6, 1926.  1,591,101
R. L. RAMSEY
MOTION PICTURE PROJECTING MACHINE
Filed Nov. 16, 1923  2 Sheets-Sheet 1
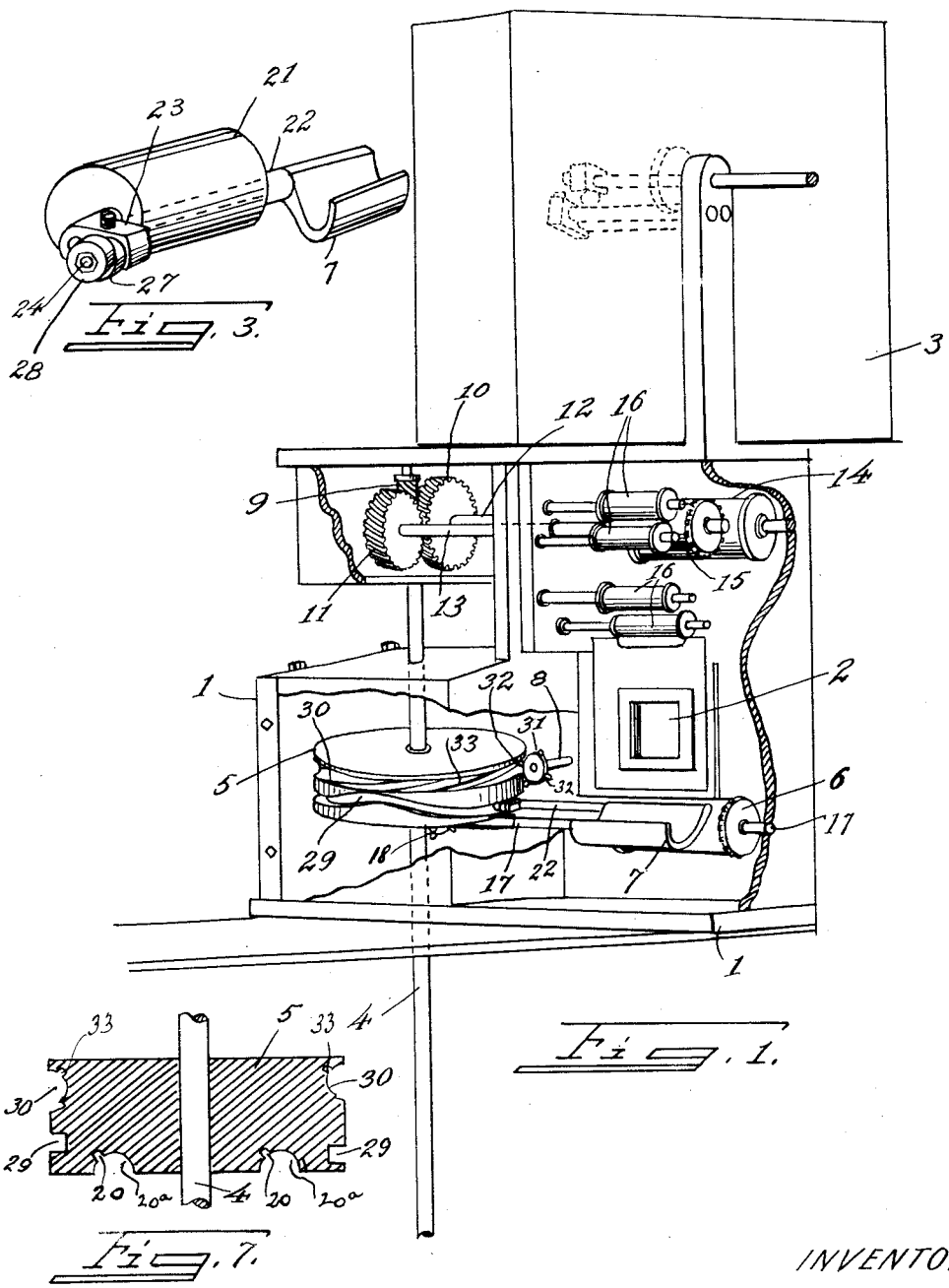
INVENTOR:
Robert L. Ramsey
BY Arthur H. Ewald,
ATTORNEY.

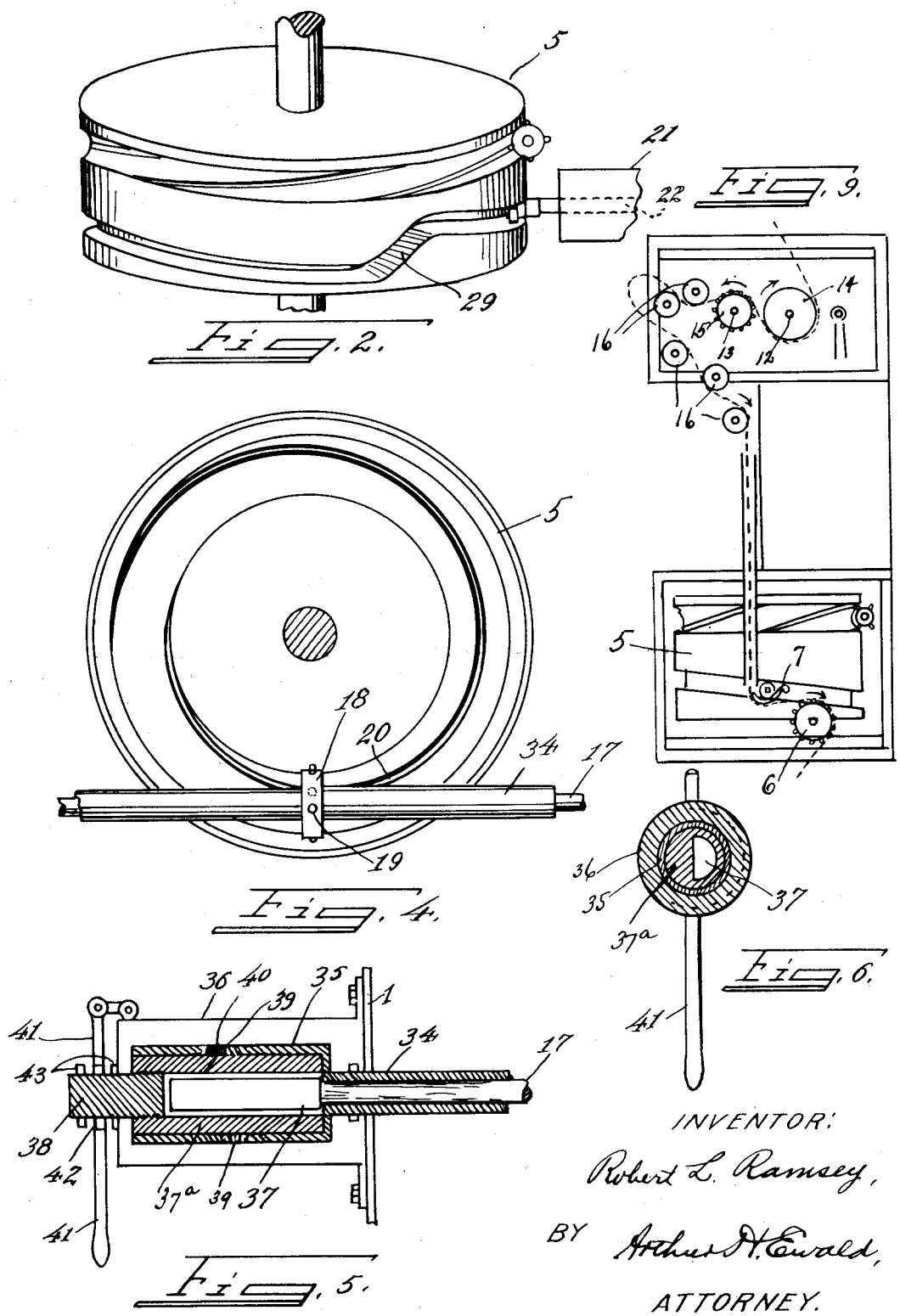

Patented July 6, 1926.

1,591,101

UNITED STATES PATENT OFFICE.

ROBERT L. RAMSEY, OF CINCINNATI, OHIO.

MOTION-PICTURE-PROJECTING MACHINE.

Application filed November 16, 1923. Serial No. 675,215.

My invention relates to motion picture projecting machines, and has particular reference to improvements in film advancing and shutter mechanisms.

The principal object of this invention is to provide in a motion picture machine improved actuating devices for advancing the film past the aperture of the machine during operation.

A further object of the invention is to provide a presser mechanism whereby the film is advanced without strain being placed upon the film perforations.

Another object of the invention is to provide unitary means for operating a presser mechanism and the lower sprocket of a motion picture machine.

A still further object of this invention is to provide means whereby the film is relieved of strain from the upper sprocket of a motion picture machine.

Another object of the invention is to provide improved means for adjusting the film so that the picture registers with the aperture of the machine.

Other objects of the invention will appear from the following detailed description thereof.

In the drawings:—

Figure 1 is a perspective of a portion of a motion picture machine containing the novel features constituting my invention;

Figure 2 is a perspective of the cam block for the operation of the presser, lower sprocket and shutter mechanisms;

Figure 3 is a perspective of the presser mechanism;

Figure 4 is a bottom view of the cam block and immediate connections illustrating the lower sprocket drive;

Figure 5 is a longitudinal section of the film adjusting mechanism;

Figure 6 is a transverse section of said mechanism;

Figure 7 is a section of the cam block;

Figure 8 is a section of the presser rollers;

Figure 9 is a sectional view of the device illustrating the film travel.

The numeral 1 indicates a portion of the frame of a motion picture machine, 2 the aperture of the machine, and 3 the upper film magazine thereof. Vertically mounted in bearings in the machine is a shaft 4 which is arranged to drive the various mechanisms involved in the present invention, said shaft being driven by the usual hand or power devices commonly in use at the present time. Rigidly mounted on the shaft 4 and laterally disposed with reference to the aperture 2 is a cam block or wheel 5 which is arranged to actuate the lower film advancing sprocket 6 and presser 7 as well as the usual shutter (not shown) which is mounted on the outer end of a shaft 8 in bearings in the frame. The shaft 4 continues upwardly above the cam block 5 and near its upper end is provided with a worm 9 arranged to actuate worm gears 10 and 11 respectively. The worm gears 10 and 11 are rigidly mounted on shafts 12 and 13 respectively. Rigidly mounted on the shaft 12 inside the frame 1 is a large roller 14, the same being disposed adjacent, but not in contact with the upper sprocket 15, the latter being rigidly mounted on the shaft 13. Mounted in the frame 1 are the usual guide rollers 16, which carry the film down to the aperture from the upper magazine.

Mounted in bearings in the frame 1 below and to the front of the aperture 2 is the lower sprocket 6, which is rigidly secured on a shaft 17. The shaft 17 extends under the cam block 5 and is provided with a wheel 18, which is keyed on a sleeve 34 through which the shaft 17 passes. The wheel 18 is provided with peripheral pins 19 which are arranged to engage in a spiral cam slot 20 located in a circular recess or groove 20ª, in the under face of the cam block 5, the slot 20 thus actuating, when the block 5 is rotating, the shaft 17 and sprocket 6. The groove 20ª is of sufficient depth to receive the arc of the wheel 18 between adjacent pins 19.

Also mounted in a bearing 21 in the frame is a shaft 22, one end of which carries the presser 7, the latter being located below the aperture 2 of the machine. The other end of the shaft 22 is provided with a short arm 23 which extends at right angles to the shaft. Secured in the arm 23 is a pin 24, the free end of which is provided with eccentric axes 25 and 26 and rollers 27 and 28. The peripheral face of the block 5 is provided with a cam slot 29, and the rollers 27 and 28 are arranged to bear against the upper and lower sides of said slot respectively, it being understood that the shaft 22 is radially disposed with reference to the cam block 5. The slot 29 is so shaped as to rock the shaft 22, so as to move the presser 7 with a rapid intermittent downward movement and a slow or gradual upward movement.

The peripheral face of the block 5 is also provided with a groove 30 above the slot 29, said groove being of a depth to accommodate the arc between adjacent pins of a wheel 31 on the end of the shutter shaft 8. The wheel 31 is provided with pins 32 which are arranged to engage in spiral slots 33 inside the groove 30 so as to actuate the shutter when the block 5 is in rotation.

In order to adjust the film in relation to the aperture 2 so that the several views will register accurately, the shaft 17 of the lower sprocket 6, and the sleeve 34, are prolonged, so as to extend beyond the opposite wall of the frame 1, the outer end of the sleeve being enlarged to form a cylinder 35 which extends beyond the end of the shaft in a housing 36 secured to the outside of the frame 1. The outer end of the shaft 17 is of half-round construction, as shown at 37 in the drawings. Slidably mounted on the half-round section of the shaft inside the cylinder 35 of the sleeve 34, is a short sleeve 37a, into the outer end of which a pin 38 is threaded. The inner face of the cylinder 35 is provided with a spiral groove 39 in which a spiral ridge 40 on the sleeve 37a engages. Pivotally mounted on the housing 36 is a lever 41, provided with a ring 42, which engages loosely around the pin 38, said pin being provided with shoulders 43 against which the ring 42 is arranged to abut for the purpose hereinafter set forth.

The film travels and is actuated by the several mechanisms above described as indicated in Figure 8 of the drawings. From the upper magazine it passes around the roller 14 over the sprocket 15 and around the various guide rollers 16 as shown in said figure past the aperture 2. The film then passes under the presser 7 and thence over and around the lower sprocket 6 to the lower magazine, not illustrated.

In operation the shaft 4 is driven by hand or any suitable power device actuating the cam block 5 as well as the worm gears 10 and 11. The worm gears 10 and 11 respectively drive the roller 14 and sprocket 15; the roller 14 by reason of its comparatively large circumference frictionally engages the film to relieve greatly the stress and strain which would otherwise be placed upon the film perforations by the sprocket 15. The presser 7 is intermittently moved downward by the cam slot 29 in the block 5, and thus intermittently carries downwardly the film, it being understood, of course, that each movement of the presser 7 is sufficient in extent to carry down the film from one view to the next succeeding view. The presser then gradually rises. Coincidently the lower sprocket 6 is in constant rotation, actuated by the cam block, the movement of the sprocket and relative distances between the presser when in raised and in its lower positions and the sprocket being such that the sprocket at all times maintains the film taut against the presser. In order to accomplish this, it will be understood that the presser in its lower position must be just as much nearer to the sprocket than when in its raised position, as the sprocket will rotate during the interval required by the downward movement of the presser, and that the upward movement of the presser must be timed accurately in relation to the movement of the sprocket so as to release the film as it is being taken up thereby. It will thus be seen that the film perforations are relieved from the strain which is imposed thereupon where a sprocket is required to actuate the downward movement of the film past the aperture At the same time the shutter shaft 8 is being actuated by means of the spiral slots 33 in the peripheral face of the cam block 5, thus actuating the shutter in unison with the other mechanisms.

By reason of the eccentric axes of the rollers 27 and 28, actuating the presser 7 there is an automatic adjustment for wear both in the groove 29 as well as of the rollers themselves, and the rollers are provided at all times with perfect bearings on the sides of the cam groove. Further adjustments may be made by rotating the pin 24 in the arm 23.

In order to adjust the film with reference to the aperture 2 it is only necessary to operate the lever 41 by drawing the lower end thereof outwardly or forcing it inwardly. Such action longitudinally displaces the sleeve 37a with respect to the cylinder 35 of sleeve 34, the spiral 40 of the former operating in groove 39 of the cylinder so as to rotate the sleeve 37a in relation to the sleeve 34, it being understood that the pin 38 is free to rotate in the ring 42 of the lever. This rotation of the sleeve 37a causes a corresponding relative rotation of the shaft 17, the half-round end of which permits the relative longitudinal movement of the sleeve 37a, but locking against relative rotation.

It will be understood that various modifications in the details of construction may be made without departing from the spirit and scope of the present invention, as for instance, the lower sprocket and shutter operating elements may comprise peripheral slots in the actuating wheels arranged to be engaged by spiral ridges in the grooves of the cam block. I desire therefore, to have it understood that all such modifications are deemed a part of the present invention as above described, and as covered by the appended claims.

Having thus fully described my invention, what I claim as new, and desire to secure by Letters Patent, is:—

1. In a motion picture projecting machine, in combination with a cam block, said block being provided with a cam slot, presser mechanism for advancing the film, comprising a rock shaft mounted adjacent said block, a short arm on one end of said shaft adjacent the block, a pin secured in the free end of said arm so as to enter said slot, said pin being provided with eccentric axes for rollers, rollers mounted on said axes and arranged to bear respectively on the sides of said slot, and a presser on the free end of said shaft.

2. In combination with a cam block, a rotating shaft mounted in adjacent relation with one face of said block, a circular recess in the adjacent face of said block, a wheel secured on said shaft and arranged to rotate in said recess, and co-operating means in said recess and on said wheel whereby the rotation of said block is arranged to rotate said shaft.

3. In combination with a cam block, a rotating shaft mounted in adjacent relation with one face of said block, a circular recess in the adjacent face of said block, a wheel secured on said shaft and arranged to rotate in said recess, a plurality of peripheral pins on said wheel, and a spiral slot in said recess and arranged to engage said pins, whereby the rotation of said block is arranged to rotate said shaft.

4. In combination with a circular cam block, a shaft rotatably mounted on an axis tangent with the periphery of said block, a peripheral recess in said block, a wheel secured on said shaft and adapted to rotate in said recess, and co-operating means in said recess and on said wheel whereby the rotation of said block is arranged to rotate said shaft.

5. In combination with a circular cam block, a shaft rotatably mounted on an axis tangent with the periphery of said block, a peripheral recess in said block, a wheel secured on said shaft and adapted to rotate in said recess, peripheral pins in said wheel and a spiral slot in said recess arranged to engage said pins, whereby the rotation of said block is arranged to rotate said shaft.

6. In a motion picture projecting machine, a shaft, a sprocket mounted on said shaft, a sleeve, said sleeve being provided with an enlarged cylindrical end portion extending beyond the end of said shaft, a short sleeve slidably mounted on the end of said shaft, said sleeve and shaft being interlocked against relative rotation, a spiral interlocking means between said cylinder and said short sleeve, an actuating wheel mounted on said sleeve, means for the actuation of said wheel, and means whereby said short sleeve may be moved longitudinally with respect to said shaft in said cylinder whereby the spiral interlocking means is caused to rotate said shaft in relation to said sleeve.

7. In combination with a cam block, said block being provided with a cam slot, a shaft mounted adjacent said block, a short arm on the end of said shaft adjacent said block, a pin secured in the free end of said arm so as to enter said slot, said pin being provided with eccentric axes, and rollers mounted on said axes and arranged to bear respectively on the sides of said slot.

ROBERT L. RAMSEY.